United States Patent
Mazurek

(10) Patent No.: US 11,855,544 B2
(45) Date of Patent: Dec. 26, 2023

(54) SINGLE STAGE SYNCHRONOUS HARMONIC CURRENT CONTROLLED POWER SYSTEM

(71) Applicant: Lee Fredrik Mazurek, Groton, CT (US)

(72) Inventor: Lee Fredrik Mazurek, Groton, CT (US)

(73) Assignee: Lee Fredrik Mazurek, Groton, CT (US)

( * ) Notice: Subject to any disclaimer, the term of this patent is extended or adjusted under 35 U.S.C. 154(b) by 119 days.

(21) Appl. No.: 17/731,632

(22) Filed: Apr. 28, 2022

(65) Prior Publication Data

US 2023/0246557 A1 Aug. 3, 2023

Related U.S. Application Data

(60) Provisional application No. 63/306,334, filed on Feb. 3, 2022.

(51) Int. Cl.
*H02M 3/335* (2006.01)
*H02M 1/42* (2007.01)
*H02M 1/00* (2006.01)
*H02M 3/00* (2006.01)

(52) U.S. Cl.
CPC ..... *H02M 3/33584* (2013.01); *H02M 1/0009* (2021.05); *H02M 1/4241* (2013.01); *H02M 3/01* (2021.05); *H02M 3/33571* (2021.05); *H02M 3/33576* (2013.01); *H02M 1/0025* (2021.05)

(58) Field of Classification Search
CPC ......... H02M 3/33584; H02M 3/33569; H02M 3/33592; H02M 1/0009; H02M 1/0025; H02M 1/0054; H02M 1/0058
See application file for complete search history.

(56) References Cited

U.S. PATENT DOCUMENTS

| | | | | |
|---|---|---|---|---|
| 4,331,263 A | * | 5/1982 | Brown | B65G 27/32 318/132 |
| 4,730,243 A | * | 3/1988 | Glennon | H02M 3/28 363/44 |
| 5,115,185 A | * | 5/1992 | Fraidlin | H02M 3/33507 363/45 |
| 5,349,516 A | * | 9/1994 | Megeid | H02M 1/4258 315/411 |

(Continued)

*Primary Examiner* — Yusef A Ahmed

(57) ABSTRACT

A synchronous average harmonic current controller is used to simultaneously control line load current and switching transformer current for a resonant power converter. The controller takes its feedback input from a current command and a bridge current sensor which measures total current flowing between the bridge switching nodes. The controller is implemented using an inverting switched capacitor filter. The filter switches two capacitors across the output and inverting node of an error amplifier to integrate and compensate current error synchronously over each half of the fundamental period. The superimposed non-modulated common and modulated difference feedback signals apply duty cycle and phase control which reduces the synchronous average error current. As a result of synchronous average current control of the line load and transformer currents, the primary and secondary bridge have a defined voltage relationship which is straightforward to regulate.

12 Claims, 6 Drawing Sheets

(56) References Cited

U.S. PATENT DOCUMENTS

| | | | | |
|---|---|---|---|---|
| 5,654,880 | A * | 8/1997 | Brkovic | H02M 1/4258 363/17 |
| 5,745,358 | A * | 4/1998 | Faulk | H02M 3/33576 363/21.16 |
| 5,969,962 | A * | 10/1999 | Gabor | H02M 1/4225 363/81 |
| 6,282,104 | B1 * | 8/2001 | Kern | H02M 1/12 363/40 |
| 8,242,703 | B2 * | 8/2012 | Wang | H05B 45/385 315/307 |
| 8,693,213 | B2 * | 4/2014 | Jungreis | H02M 1/4241 363/17 |
| 9,257,913 | B1 * | 2/2016 | McDonald | H02M 3/3376 |
| 9,287,795 | B2 * | 3/2016 | Ma | H02M 3/3388 |
| 9,425,700 | B2 * | 8/2016 | Lu | H02M 3/3376 |
| 10,541,598 | B1 * | 1/2020 | Rozman | H02P 9/00 |
| 10,680,510 | B2 * | 6/2020 | Elferich | H02M 3/01 |
| 10,917,017 | B1 * | 2/2021 | McFarland | H02M 3/3376 |
| 2008/0290846 | A1 * | 11/2008 | Kanouda | H02M 1/4225 323/222 |
| 2009/0021964 | A1 * | 1/2009 | Hsu | H02J 3/1842 363/39 |
| 2011/0025289 | A1 * | 2/2011 | Wang | H02M 3/3387 323/285 |
| 2011/0095734 | A1 * | 4/2011 | Orr | H02M 3/3376 323/207 |
| 2011/0156643 | A1 * | 6/2011 | Chen | B60L 53/20 320/109 |
| 2011/0216558 | A1 * | 9/2011 | Uno | H02M 1/4225 363/126 |
| 2011/0222318 | A1 * | 9/2011 | Uno | H02M 3/33523 363/21.04 |
| 2012/0106206 | A1 * | 5/2012 | Tang | H02M 3/3376 363/21.02 |
| 2013/0044521 | A1 * | 2/2013 | Zhao | H05B 45/382 363/21.17 |
| 2013/0099788 | A1 * | 4/2013 | Xu | H02M 3/3376 324/322 |
| 2014/0078782 | A1 * | 3/2014 | Rosado | H02M 3/33584 363/17 |
| 2014/0307483 | A1 * | 10/2014 | Sigamani | H02M 1/4225 363/21.04 |
| 2015/0023068 | A1 * | 1/2015 | Uno | H02M 3/33515 363/21.13 |
| 2015/0078041 | A1 * | 3/2015 | Huang | H02M 1/4225 363/21.18 |
| 2015/0222193 | A1 * | 8/2015 | Zambetti | H02M 1/08 363/21.02 |
| 2015/0372598 | A1 * | 12/2015 | Akiyama | H02M 3/285 363/17 |
| 2016/0139651 | A1 * | 5/2016 | Schramm | H02M 3/33584 713/323 |
| 2016/0181925 | A1 * | 6/2016 | Chiang | H02M 3/33584 363/17 |
| 2017/0279376 | A1 * | 9/2017 | Siri | H02M 7/5395 |
| 2018/0054134 | A1 * | 2/2018 | Moon | H02M 1/08 |
| 2019/0052178 | A1 * | 2/2019 | Ishikura | H02M 3/33571 |
| 2019/0097544 | A1 * | 3/2019 | Albertini | H03L 7/0807 |
| 2019/0199194 | A1 * | 6/2019 | Nikitin | H02M 7/53873 |
| 2019/0252972 | A1 * | 8/2019 | Minaki | H02P 6/10 |
| 2019/0312519 | A1 * | 10/2019 | Iida | H02M 7/5387 |
| 2020/0099288 | A1 * | 3/2020 | Young | H02M 1/32 |
| 2021/0111629 | A1 * | 4/2021 | Gray | H02M 3/28 |
| 2021/0305903 | A1 * | 9/2021 | Furukawa | H02M 1/0006 |
| 2022/0029528 | A1 * | 1/2022 | Chan | H02M 1/4225 |
| 2022/0166307 | A1 * | 5/2022 | Wrathall | H02M 1/4225 |
| 2022/0247320 | A1 * | 8/2022 | Stracquadaini | H02M 3/33569 |
| 2022/0393604 | A1 * | 12/2022 | Mazurek | H02M 1/0058 |
| 2022/0393605 | A1 * | 12/2022 | Mazurek | H02M 1/0022 |
| 2023/0095989 | A1 * | 3/2023 | Hashimoto | H02M 3/33573 363/17 |
| 2023/0246557 | A1 * | 8/2023 | Mazurek | H02M 3/33584 363/21.02 |

* cited by examiner

SINGLE STAGE SYNCHRONOUS HARMONIC CURRENT CONTROLLED POWER SYSTEM

CROSS-REFERENCE TO RELATED APPLICATIONS

This application claims the benefit of U.S. provisional application 63/306,334 filed Feb. 3, 2022, which is incorporated by reference herein in its entirety. This application is related to U.S. non-provisional application Ser. Nos. 17/727,757 and 17/727,774 filed Apr. 24, 2022.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Not applicable

BACKGROUND OF THE INVENTION

The present disclosure generally relates to a current controlled bidirectional power conversion system, and more specifically, to a resonant power converter with synchronous average harmonic current control of switching and line currents and methods of controlling the same.

Line connected power converters are used to transmit power between an isolated DC bus voltage and an AC line for renewable and power generation applications. Typical prior art implementations use at least two stages: an isolated DC to DC converter stage, and a DC to AC inverter stage. The isolated DC to DC converter stage is usually galvanically isolated to addresses safety and interaction problems and may also include voltage regulation. The inverter stage converts DC voltage to AC line voltage and typically also includes power factor correction to transfer power in a controlled manner. A prior art two stage inverter is shown in FIG. 1, where the first DC to DC stage is implemented using a resonant power converter and the second DC to AC stage is implemented using a power factor corrected inverter. The resonant DC to DC power converter shown in FIG. 1 has a resonant half-bridge (101), bridge rectifier (100, {D1, D2, D3, D4}) and controller (109). The DC to AC inverter shown in FIG. 1 has an H-bridge (102) and power factor correction controller (106). An active rectifier may be used in place of the passive bridge rectifier (100) to improve efficiency or to enable bi-directional power transfer at the expense of additional parts and controller complexity. Prior art single stage implementations include the Flyback and auk architectures which are used to implement isolated power factor corrected DC to AC inverters with minimal parts complexity. However, the single stage flyback and auk architectures may require relatively high magnetic and switch currents respectively which limit them to low power applications. In low noise power factor corrected applications, the flyback and auk converters may also need an added voltage regulation stage. It is desirable to implement regulated bidirectional power conversion in a single stage with controlled switching and line currents.

BRIEF SUMMARY OF THE INVENTION

In one aspect, the objective of this invention is to implement efficient bidirectional current controlled power transfer and voltage regulation in a single stage. This is accomplished in the present invention using a synchronous average harmonic current controller which simultaneously controls on switching current and line current using negative feedback on sensed bridge current. The current signal is fed back using a superimposed modulated and non-modulated reference frame to control the switching current and line current respectively. At the operating point established by the synchronous average harmonic current controller, there is a well-defined relationship between the primary and secondary bridges which is used for voltage regulation. FIG. 2 shows the first embodiment of the presently invented power converter. A synchronous average harmonic current controller (208) controls on the total current across the primary bridge (202) sensed using a resistive shunt current sense amplifier (207). The total current across the primary bridge is the sum of the low frequency current through the line connected load (LOAD) and the high frequency switching current through the isolation transformer primary (LT1). A synchronous average harmonic current controller is implemented using an inverting switched capacitor filter. The switched capacitor filter integrates and compensates the difference between the current sense amplifier and the current command (ICMD) synchronously over each half of the switching period. The common voltage of the switched capacitors encodes the primary bridge duty cycle control input which results in the load current tracking the current command. The difference voltage of the switched capacitors encodes a relative phase control signal which results in minimal synchronous average harmonic current though the transformer. After applying synchronous average harmonic current control, the power converter state is determined by the commanded load current, the secondary bridge duty cycle (d2) and the synchronous triangle waveform oscillator (TRI). A second embodiment (FIG. 4) implements power factor correction in a single stage using a shaped current command and synchronous feedforward voltage regulation. A third embodiment (FIG. 5) uses the bidirectional power transfer of the presently invented converter to implement a single stage power factor corrected low noise voltage regulated power supply. Each of the embodiments allow for voltage regulation and have well controlled switching and load currents using a single power stage.

These and additional objects and advantages provided by the embodiments described herein will be more fully understood in view of the following detailed description, in conjunction with the drawings.

BRIEF DESCRIPTION OF THE SEVERAL VIEWS OF THE DRAWING(S)

DETAILED DESCRIPTION OF THE INVENTION

Figure 1:
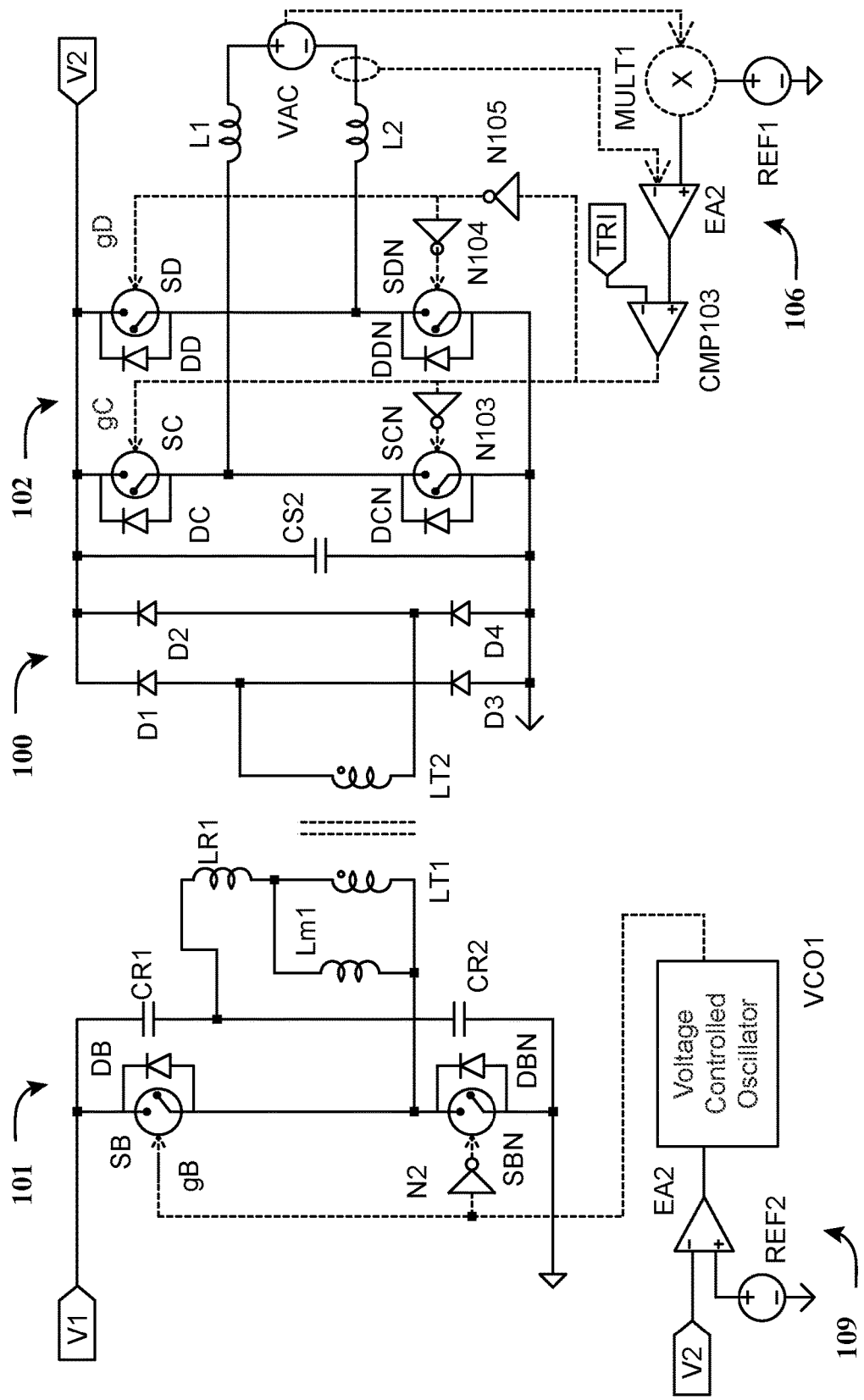
FIG. 1 is an illustration of a prior art two stage power inverter, where the first stage is a resonant DC to DC converter (101, 100, 109), and the second stage is a power factor corrected DC to AC inverter (102, 106).
Figure 2:
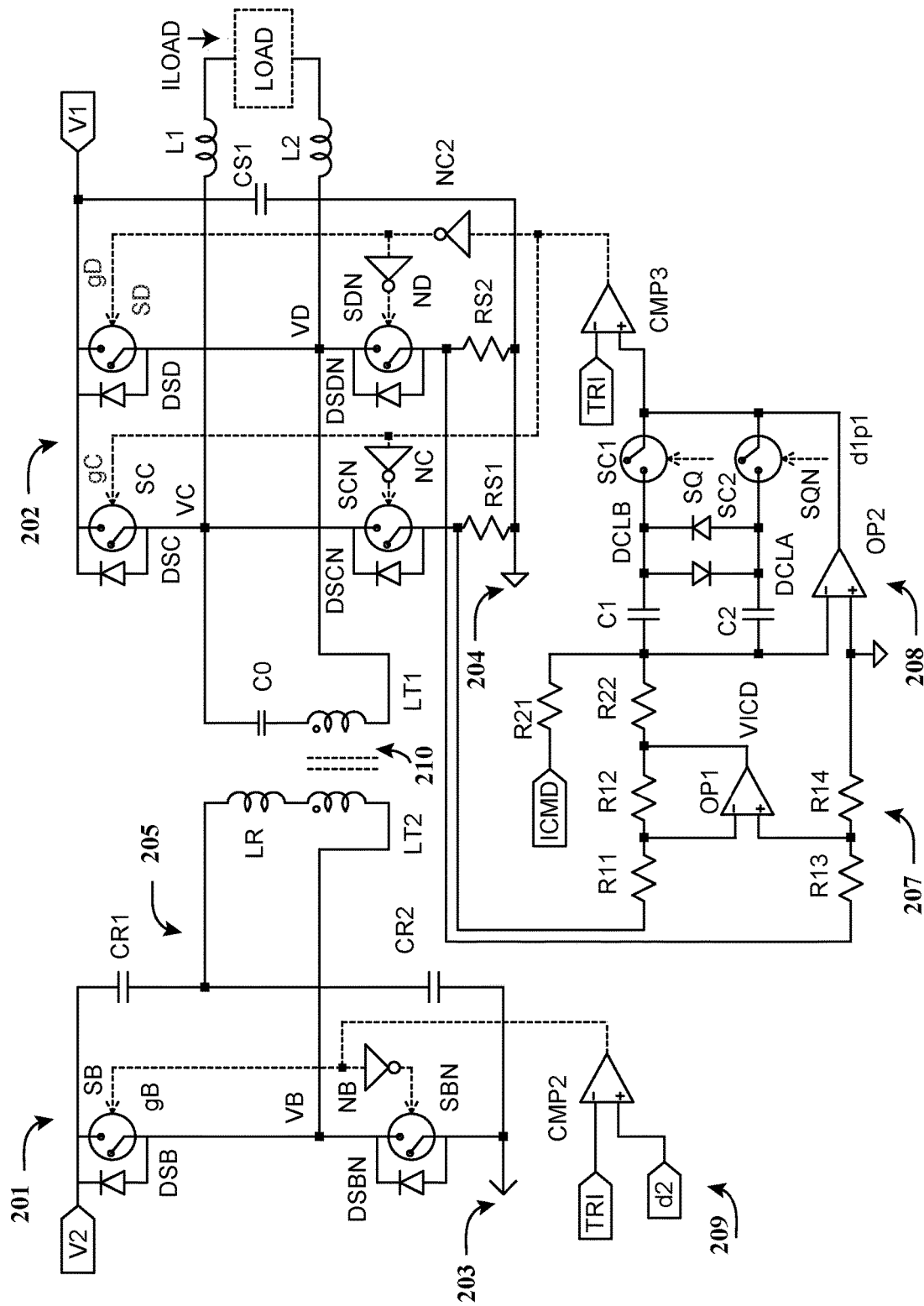
FIG. 2 illustrates the first embodiment of the presently invented power converter system which uses an inverting switched capacitor filter to implement a synchronous average harmonic current controller according to one or more embodiments shown and described herein.
Figure 3:
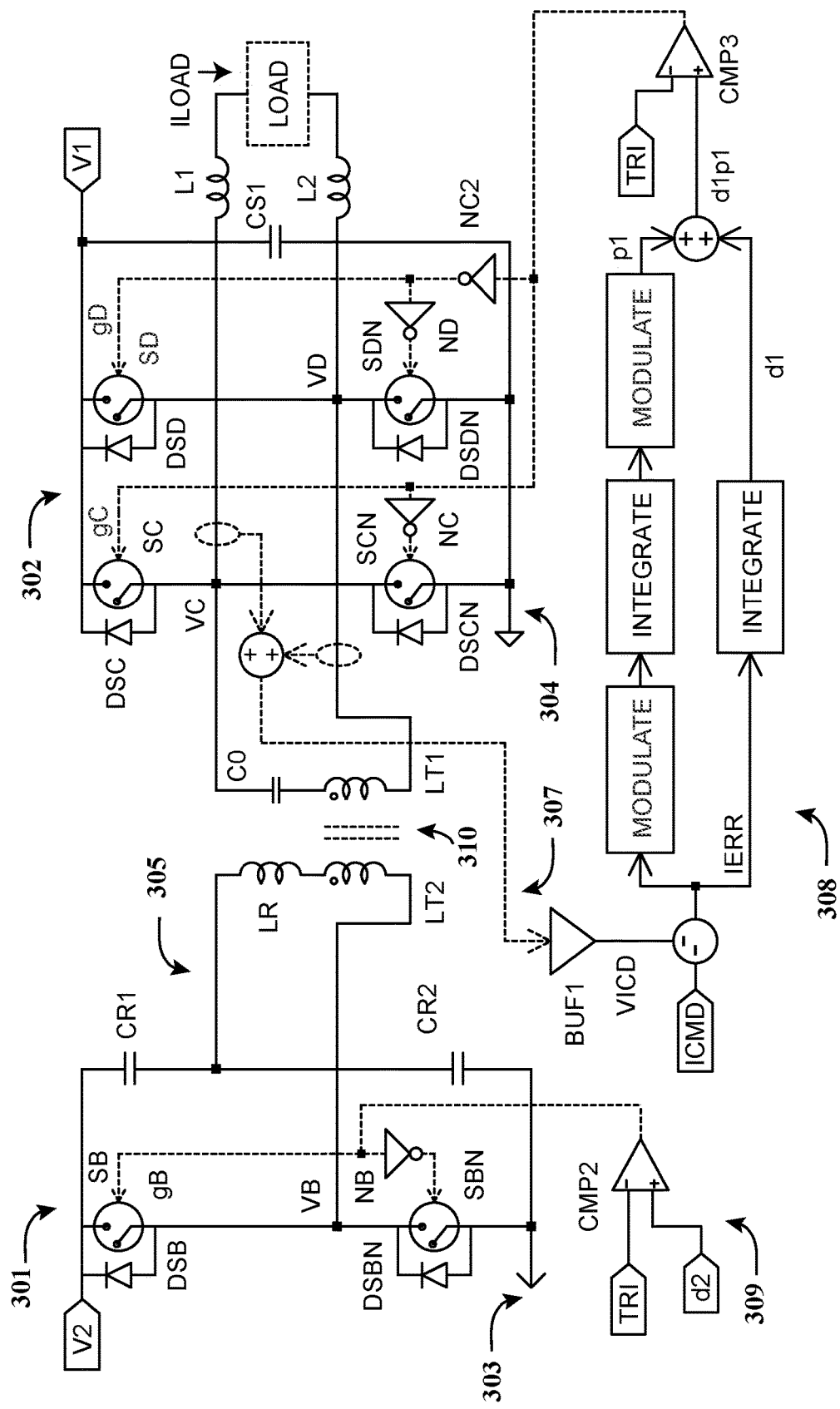
FIG. 3 illustrates the embodiment shown in FIG. 2 using a functional block diagram to represent current sensing and control components.
Figure 4:
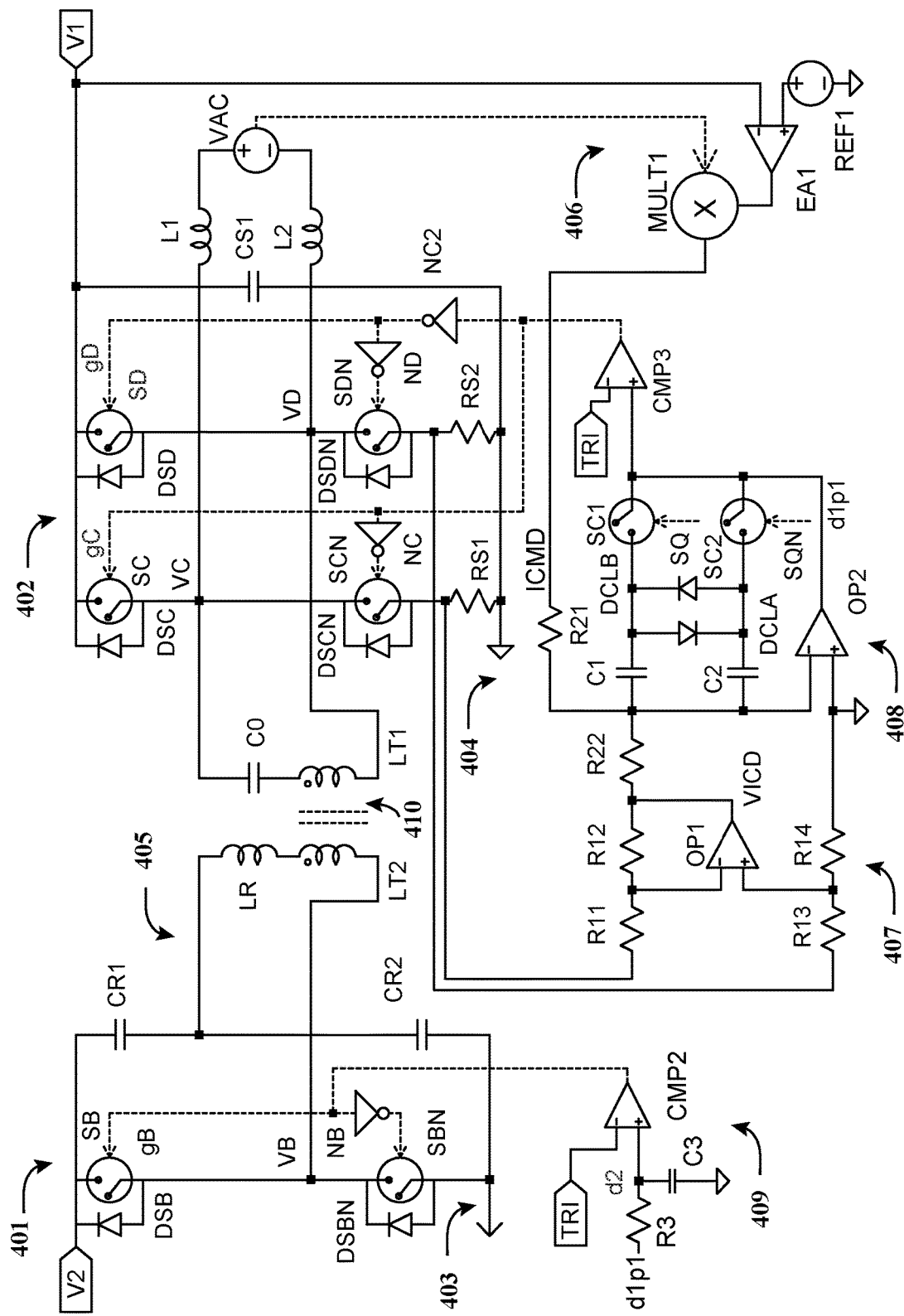
FIG. 4 illustrates a second embodiment of the presently invented power converter system which is configured as a single stage power inverter according to one or more embodiments shown and described herein.
Figure 5:
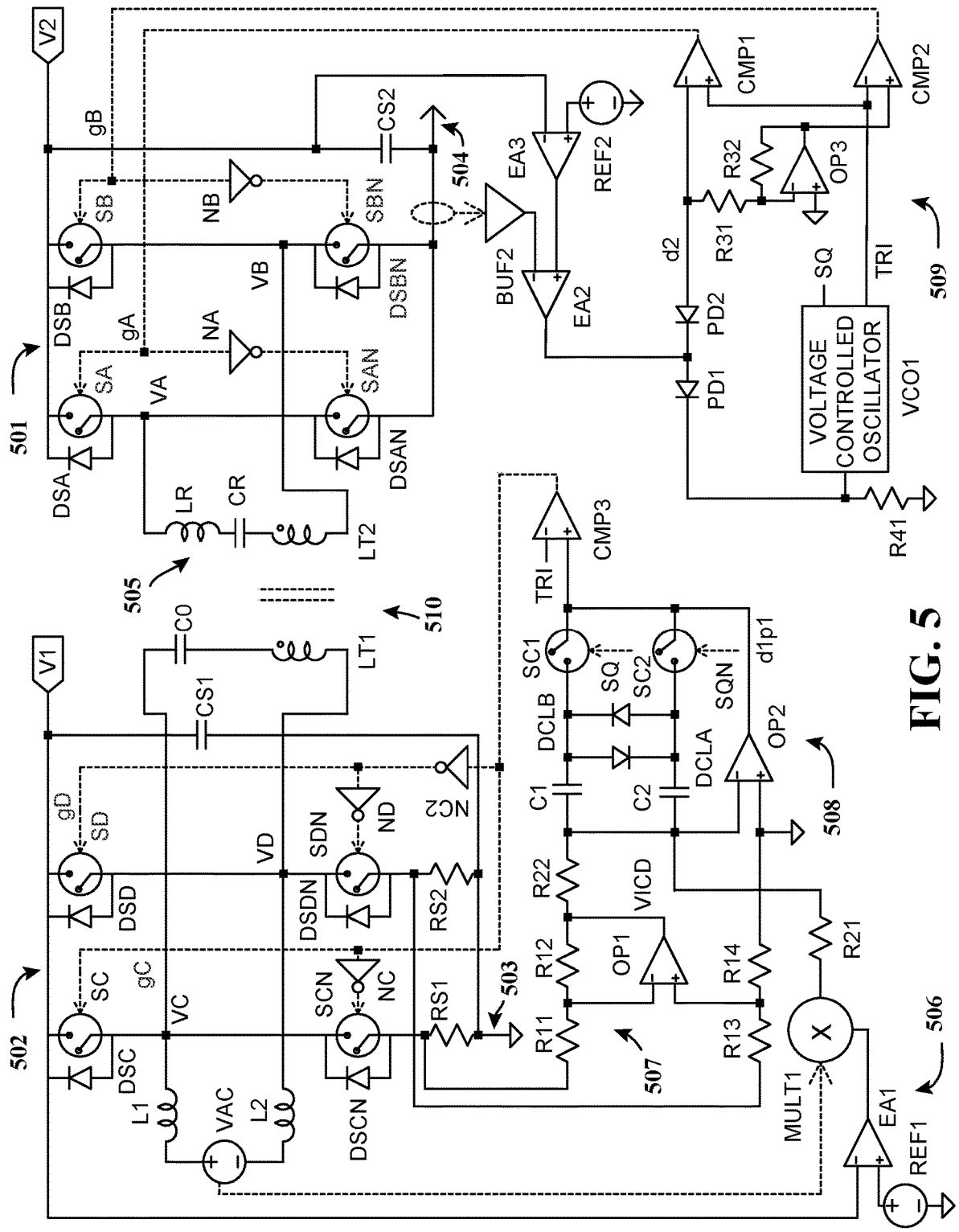
FIG. 5 shows a third embodiment of the presently invented power converter system configured as a single stage regulated power factor correcting power supply according to one or more embodiments shown and described herein.
Figure 6:
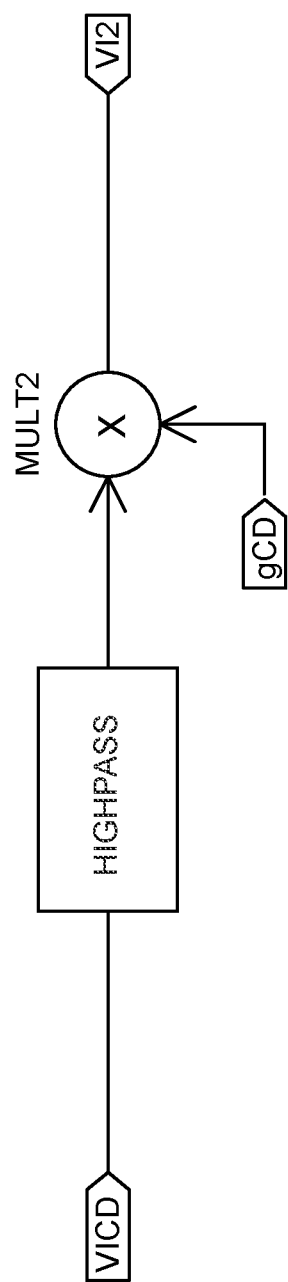
FIG. 6 illustrates a method for implementing an isolated current sensor used in the embodiment shown in FIG. 5.

Embodiments described herein generally relate to a current controlled resonant power converter and methods of forming a resonant power converter with synchronous average harmonic current control. As shown and described herein, new embodiments of resonant power converters with synchronous average harmonic current control of both load and transformer switching current are provided. The present invention is implemented using a single power stage. A synchronous average harmonic current controller simultaneously controls the synchronous average current transferred between the primary and secondary side bridges and current to the load. This results in the presently invented single stage power converter having reduced parts complexity relative to comparable conventional solutions which implement similar functionality using multiple stages. Embodiments of the presently invented converter are briefly described in this paragraph and then sequentially in detail in following paragraphs. FIG. 2 and FIG. 3 illustrate the presently invented synchronous average harmonic current controlled power system. FIG. 4 illustrates a single stage isolated power inverter which is a second embodiment of the present invention. FIG. 5 illustrates a third embodiment which implements a single stage isolated power supply with power factor correction and low noise buck/boost voltage regulation. FIG. 6 illustrates a method for implementing isolated current sensing which is used in the embodiment shown in FIG. 5. The inverter and regulated power supply are embodiments of the present invention which use a single stage to efficiently implement.

The first embodiment of the presently invented power system is illustrated in FIG. 2. According to convention, the bi-directional converter is illustrated with the power source on the left and an AC line connected load on the right. In the cross-referenced applications, one bridge is labeled as resonant indicating its voltage is coupled to the transformer through a resonant network and the other bridge is labeled as non-resonant indicating its switching voltage is transformer coupled. The cross-referenced converter architecture is bidirectional so the terms primary bridge and secondary bridge are avoided. However, in this application, embodiments are shown which result in reduced sensing and control complexity by fixing the line connected load to the non-resonant bridge. The non-resonant bridge is referred to as the primary bridge in this application due to its connection to the transformer primary and the AC line load. The resonant bridge is referred to as the secondary bridge in this application due to its connection to the transformer secondary which is isolated from the line.

The presently invented power system simultaneously reduces the synchronous average harmonic current transmitted between the primary bridge (202) and the secondary bridge (201), and controls current (ILOAD) into the load (LOAD). Voltage is filtered through the resonant network (205) and transmitted across the transformer (210) between isolated references (203 and 204 respectively). The total current transmitted through the primary bridge (between nodes VC and VD) is sensed by the current sense amplifier (207). The synchronous average harmonic current controller (208) tracks the commanded load current (ICMD) and minimizes synchronous average harmonic switching current using superimposed modulated and non-modulated negative feedback to the phase and duty cycle of the primary bridge (d1$p$1). The duty cycle (d2) of the secondary bridge (201) is independently varied by the secondary pulse width modulation controller (209) to control voltage.

A secondary bridge (201) is illustrated in FIG. 2 using a half bridge configuration. An alternative full secondary bridge (501) configuration is shown in FIG. 5 with the associated tradeoffs of higher parts count and lower current stress. The secondary bridge (201) is comprised of switches (SB and SBN) and diodes (DSB and DSBN) which switch the secondary DC bus voltage (V2) using the gate signal (gB) and its logical inverse given by NB. The switches are implemented according to the state of the art, where GAN-FETs or low reverse recovery charge MOSFETs are preferred to minimize switching losses. The complementary switches (SB and SBN) are driven with gate drivers which represent the gate drive signal, gB, and its logical complement with sufficient dead-time to prevent shoot through current. The secondary pulse width modulation controller (209) compares the synchronous triangle waveform (TRI) to the secondary duty cycle command (d2) using a comparator (CMP2) to create the gate signal, gB. The gate signal (gB) is used by the secondary bridge (201) to imposes the voltage, VB, across the resonant network (205) and transformer (210). The resonant network (205) is composed of the inductor, LR, and parallel capacitors, CR1 and CR2. An effective parallel magnetizing inductor may be present across LT1, but is not required in this design. The isolation transformer (210) isolates the voltage references (203 and 204) and couples the primary and secondary bridges (202 and 201 respectively) using the magnetically coupled inductors LT1 and LT2. A DC blocking capacitor, C0, is placed in series with LT1 to eliminate DC voltage from the differential primary bridge voltage (VC and VD) driving the transformer.

A primary bridge (202) is implemented using a full bridge configuration in the embodiment shown in FIG. 2. The primary bridge consists of four switches (SC, SCN, SD, SDN), their effective diodes (DSC, DSCN, DSD, DSDN) and complementary gate inverters (NC, NC2, and ND) which take gate inputs gC and gD respectively. The switches are implemented according to the state of the art, with GANFETS or low reverse recovery charge MOSFETS being preferred to minimize switching losses. The complementary switches (SC and SCN, and SD and SDN respectively) are driven with gate drivers which represent the gate drive signals (gC and gD) and their logical complements with sufficient dead-time to prevent shoot through current. The gate drive signals and their complements may be generated using standard gate driver integrated circuits. The primary bridge switches the bus voltage, V1, and uses stored energy from the capacitor, CS1, to modulate the bridge voltages, VC and VD. The modulated voltages, VC and VD, are used to impose a high frequency voltage across the transformer coil LT1 through capacitor C0 and to impose a low frequency voltage across a line load through inductors L1 and L2. The load is arbitrary and may source or sink power. Additional filter elements, such as parallel capacitors, and series inductors may be added to attenuate high frequency load voltage. The total currents through the load (ILOAD) and through the transformer coil (LT1) are controlled by the synchronous average harmonic current controller (208).

The current flowing between the primary bridge nodes, from VC to VD, is sensed using the differential current sense amplifier (207) to drive the synchronous average harmonic current controller (208). Alternate current sense methods, such as hall sensors, are not shown here because they may not have sufficient bandwidth. The current sense amplifier (207) is composed of resistive current sense shunts (RS1 and RS2) and an opamp difference amplifier (OP1, R11, R12, R13, R14). The output of OP1, VICD, is proportional to the total current flowing from VC to VD. This is due to switch gate control signals (gC and gD) being complementary, so the bridge current alternately flows through RS1 and RS2. The current sense voltage, VICD, is fed back to the synchronous average harmonic current controller (208). The synchronous average harmonic current controller is implemented using an inverting switched capacitor filter driven by weighted sums of the current sense voltage, VICD, and the current command, ICMD. The switched capacitor filter is composed of summing resistors (R21 and R22), switched capacitors (C1 and C2), clamping diodes (DCLA and DCLB), switches (SC1 and SC2) and an inverting opamp (OP2). The resistors (R21 and R22) inject an error signal by proportionally summing the signals ICMD and VICD into the virtual ground given by the inverting node of OP2. The switched capacitors (C1 and C2), integrate and compensate the error current synchronously with the square wave (SQ) and its complement (SQN) respectively. The opamp (OP2) generates a voltage (d1p1) which reduces the synchronous error. The output of OP2 (d1p1) has both a duty cycle and phase control signal super-imposed. The non-modulated common signal stored by the switched capacitors drives duty cycle feedback, and the modulated differential signal drives phase feedback. The comparator (CMP3) compares d1p1 to the synchronous triangle waveform (TRI) to generate a gate signal (gC) and its complement (gD). The triangle wave (TRI) is the integral of the square wave used to synchronously switch the capacitors C1 and C2.

FIG. 3 illustrates functional block diagrams (307 and 308 respectively) for the current sensor (207) and synchronous average harmonic current controller (208) shown in FIG. 2. The remaining blocks in FIG. 3 (301, 302, 303, 304, 305, 306, 309, 310) are the same as their respective counterparts illustrated in FIG. 2 (201, 202, 203, 204, 205, 206, 209, 210). The bridge current sensor (307) sums the total bridge current flowing from VC to VD and buffers (BUF1) it. The total bridge current is the sum of the current through the load (ILOAD), and the current through the transformer inductor, LT1. The load current (ILOAD) is filtered by L1 and L2 which emphasize low frequencies, and the transformer inductor current (through LT1) is filtered by C0 so that it contains only high frequencies. The buffered signal (VICD) proportional to the total bridge current is fed back to the synchronous average harmonic current controller (308).

The synchronous average harmonic current controller (308) applies negative feedback to the total current error signal. The inverting opamp (OP2) shown in FIG. 2 is functionally represented (308) as an inverting summing junction which sums the inverted feedback current signal (VICD) with the inverted current command reference (ICMD) to create an error signal (IERR). The error signal is minimized using negative feedback on the analog duty cycle (d1) and phase (p1) represented by the functional signal pathways shown. The duty cycle path is controlled by the common voltage of the switched capacitors (FIG. 2, C1 and C2) which use integral feedback to reduce low frequency current error. The phase path is controlled by the difference voltage of the switched capacitors, which are synchronously switched into the circuit to modulate and integrate the synchronous average harmonic current error and sampled. The phase control, p1, and duty cycle control, d1, signals are implicitly superimposed to result in the total control signal, d1p1. The total control signal, d1p1, is compared against the synchronous triangle waveform (TRI) using CMP3 to result in the gate signals gC and gD. The modulated (approximated as square wave) part of d1p1 results in net phase shift, and the non-modulated (low frequency) part of d1p1 results in change in duty cycle as a result of the comparator.

Steady state analysis of the synchronous average harmonic current controller (308) is derived by applying the negative feedback controller to reduce error to a small threshold. The effect of the duty cycle control is analyzed in EQ1 and EQ2 at low frequencies using the DC signal component. The effect of the phase control is analyzed in EQ3, EQ4 using the first harmonic expansion of the switching frequency. EQ1 shows the total error current, $I_{ERR}$, for the DC Fourier component ($e^{j\omega t}=1$ for $\omega=0$):

$$0 \approx I_{ERR} \cdot 1 = (-(I_{LT1}+I_{LOAD})-(I_{CMD})) \cdot 1 \qquad \text{EQ1}$$

where the total error current is the negative proportional sum of the total bridge current, $(I_{LT1}+I_{LOAD})$, and the current command, $(I_{CMD})$, for the 0th harmonic. EQ2 shows the steady state result of the duty cycle control loop after eliminating the orthogonal (high frequency) Fourier components:

$$0 = (-I_{LOAD}-I_{CMD}) \cdot 1 \qquad \text{EQ2}$$

where the DC part of the transformer current, $I_{LT1}$, is zero due to the blocking capacitor C0. The load current, $I_{LOAD}$, proportionally tracks the command current, $I_{CMD}$, at steady state ($I_{LOAD}=-I_{CMD}$). EQ3 illustrates the total error current, $I_{ERR}$, for the first switching harmonic ($e^{j\omega_1 t}$ with $\omega_1$ being the first harmonic of the switching frequency):

$$0 \approx I_{ERR} \cdot g^*_{SQ,\omega 1} = (-(I_{LT1}+I_{LOAD})-(I_{CMD})) \cdot g^*_{SQ,\omega 1} \qquad \text{EQ3}$$

where $g_{SQ,\omega 1}=e^{j\omega_1 t}$ is the first harmonic of the square wave used to drive the switched capacitor filter. EQ4 shows the steady state error for the phase control loop after eliminating orthogonal (low frequency) Fourier components:

$$0 \approx I_{ERR} \cdot g^*_{SQ,\omega 1} = -I_{LT1} \cdot g^*_{SQ,\omega 1} \qquad \text{EQ4}$$

where the high frequency load signal, $I_{LOAD} \cdot g^*_{SQ,\omega 1}$, is small due to filter inductors (L1 and L2), and the high frequency command current, $I_{CMD} \cdot g^*_{SQ,\omega 1}$ is small by design. The effect of EQ2 is to track the commanded current, and the effect of EQ4 is to control the switching current of the primary and secondary bridges by minimizing synchronous average harmonic current.

Minimizing on the synchronous average harmonic current (as shown in EQ4) results in a defined voltage relationship between the primary and secondary bus voltages (V1 and V2). This is illustrated in EQ5 by expanding the transformer current term, $I_{LT1}$, from EQ4 as:

$$0 \approx -((V_1 \cdot g_{CD,\omega 1} - V_2 \cdot g_{B,\omega 1})/Z_{\omega 1}) \cdot g^*_{SQ,\omega 1} \qquad \text{EQ5}$$

where $Z_{\omega 1}$ is the impedance of the resonant network (305), $g_{B,\omega 1}$ is the first harmonic of the secondary bridge gate signal, and $g_{CD,\omega 1}$ is the first harmonic of the differential primary bridge gate signals. The voltage shown in EQ5 is equilibrated by factoring out common terms and substituting the first harmonic of the gate signals ($g_{CD,\omega 1}$ and $g_{B,\omega 1}$ respectively) as:

$$\frac{V_2}{V_1} = \frac{\sin(\pi \cdot d_1)}{\sin(\pi \cdot d_2)} \qquad \text{EQ 6}$$

which is the ratio of the sine of the primary duty cycle, $d_1$, and secondary duty cycle, $d_2$, respectively. EQ6 is the relationship the presently invented power converter uses to generate tracking bus voltages (V1=V2), by setting $d_1=d_2$, or to regulate V2 by adjusting $d_2$. EQ6 is shown assuming the transformer in FIG. 3 (310) has a 2:1 transformer turns ratio which accounts for the gain from the capacitive half bridge. The turns ratio may be adjusted to change the overall voltage gain for other embodiments.

FIG. 4 shows the second embodiment of the present invention which is a single stage power inverter. The power inverter is current controlled with power factor correction to allow for power-grid connection. The power factor correction circuit (406) and secondary pulse width modulation controller (409) are specified in this embodiment. The remaining blocks of FIG. 4 (401, 402, 403, 404, 405, 407, 408, 410) are the same as those shown in FIG. 2 (201, 202, 203, 204, 205, 207, 208, 210) respectively. The current command, ICMD, to the synchronous average harmonic current controller (408) is set by the power factor correction circuit (406). The power factor correction circuit is composed of a multiplier (MULT1), voltage error amplifier (EA1) and reference (REF1). The voltage error amplifier (EA1) scales the line current command in proportion to the different between the bus voltage (V1) and a reference voltage (REF1). The multiplier takes an input signal proportional to the line voltage (VAC) and shapes the command from the error amplifier (EA1) to result in the current command (ICMD) being in phase with the line voltage. The input to the secondary bridge pulse width modulation controller (409) is set so that the bus voltages (V2 and V1) are equal for a 2:1 transformer turns ratio (or are proportional according to an alternate turns ratio). This is accomplished by setting the secondary duty cycle (d2) equal to the primary duty cycle (d1p1) with the phase control signal filtered out. Resistor R3 and capacitor C3 are used to filter out the high frequency phase control signal and CMP2 is used to compare the duty cycle, d2, to the synchronous triangle wave (TRI) to create the gate control signal, gB. This single stage inverter application uses relatively few power and control parts to achieve power factor correction and feedforward regulation.

FIG. 5 shows the third embodiment of the present invention which is a single stage power converter with power factor correction and low noise voltage regulation. The first embodiment shown in FIG. 2 allows for bidirectional power transfer, but is drawn with power input on the left and power output on the right to illustrate a power inverter application. The third embodiment shown in FIG. 5 uses blocks similar to FIG. 2 but changes their relative illustration in the drawing to reflect left to right power flow for a conventional power supply application. The primary bridge (502), current sense amplifier (507), synchronous average harmonic current controller (508) and transformer (510) use the same components as the first embodiment shown in FIG. 2 (202, 207, 208, 210 respectively). The power factor correction controller (509) uses the same components as shown in FIG. 4 (409).

The secondary bridge (501) and resonant network (505) in FIG. 5 are modified from those shown in FIGS. 2 (201 and 205 respectively) to use a full bridge as opposed to a half bridge. The full bridge configuration has more parts than the half bridge configuration and decreases current stress. The secondary bridge for this embodiment (501) consists of four switches (SA, SB, SAN, SBN), their effective diodes (DSA, DSB, DSAN, DSBN) and complementary gate inverters (NA and NB) which use the gate control inputs (gA and gB). The switches are implemented according to the state of the art, with GANFETS or low reverse recovery charge MOSFETS being preferred to minimize switching losses. The complementary bridge switches (SA and SAN, and SB and SBN respectively) are driven with gate drivers which have sufficient dead-time to prevent shoot through current. The secondary bridge switches the bus voltage, V2, and uses stored energy from the capacitor, CS2, to modulate the bridge nodes, VA and VB. The bridge nodes, VA and VB, connect to the resonant network (505) and transformer secondary (LT2). The resonant network (505) is composed of an inductor (LR) and capacitor (CR) in series with the transformer secondary LT2. The transformer secondary may have an equivalent parallel magnetizing inductance, but it is not required for this design. The transformer (510) in FIG. 5 has a 1:1 turns ratio which results in a nominal gain of one for the converter. The transformer may be configured with a non-unity ratio for other nominal gains.

The secondary pulse width modulation controller (509) is illustrated in this embodiment to independently regulate the secondary bus voltage (V2) using no additional power stages. The embodiment shown in FIG. 4 derives the secondary duty cycle from the primary duty cycle to reduce control complexity at the expense of feedforward regulation performance. The secondary pulse width modulation controller (509) for the embodiment in FIG. 5 consists of the isolated current sensor (BUF2), voltage error amplifier (EA3) and voltage reference (REF2), current error amplifier (EA2), precision diodes (PD1 and PD2), resistors (R41, R32 and R32), a voltage controlled oscillator (VCO1), opamp (OP3), and comparators (CMP1 and CMP2). The current error amplifier (EA2) and isolated current sensor (BUF2) are used to regulate the secondary bus current. The precision diodes (PD1 and PD2) direct the control signal to boost or buck gain circuits. The precision diodes are implemented according to the state of the art using active opamp diode circuits which approximate ideal diode behavior. The voltage controlled oscillator (VCO1) and resistor (R41) are used to increase the oscillator frequency which increases the frequency dependent dynamic impedance of the resonant network resulting in bucking of the voltage output through current limiting. The duty cycle, d2, is used to boost the output voltage according to EQ6 (which is derived for non-current limited operation). The duty cycle, d2, and its inverse resulting from OP3 and R31 and R32, are used to drive CMP501 and CMP502 to generate gate signals, gA and gB respectively. The voltage error amplifier (EA3) and voltage reference are used to regulate the secondary bus voltage (V2). The added control components (509) result in low noise voltage regulation of the secondary bus voltage (V2) without requiring additional power stages relative to those used to perform isolated power transmission.

FIG. 6 shows one method for implementing the isolated current sensor (BUF2) shown in FIG. 5. The flow chart shown in FIG. 6 takes the current sensor signal, VICD, and high pass filters the signal to keep only the portion related to the current through the transformer coil (LT1). The resulting signal is then multiplied by the logical gate difference, gCD, which reproduces the secondary bridge modulation process and results in VI2 which is proportional to the secondary bridge current. The flow chart shown in FIG. 6 enables secondary bridge current sensing using only primary side components. This can simplify the embodiment of the regulated power supply shown in FIG. 5.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A power converter comprising:
a primary bridge comprising a first plurality of switching devices, wherein the first plurality of switching devices are coupled to a primary transformer winding of a transformer device and a bidirectional line load;
a secondary bridge comprising a second plurality of switching devices, wherein the second plurality of switching devices are coupled to a secondary transformer winding of the transformer device;
a resonant network coupled to the primary transformer winding, or the secondary transformer winding, or the primary transformer winding and the secondary transformer winding, wherein the resonant network comprises a capacitor or an inductor, or a capacitor and an inductor;
at least one first controller coupled to the primary bridge and configured to generate first control signals to control the first plurality of switching devices, the at least one first controller comprising:
a bridge current sensor configured to sense a measure of current flowing between switching nodes of the primary bridge, wherein the measure of current comprises a measure of transformer winding current and a measure of line current,
an error current signal comprising a sum of the measure of current and a commanded current;
a filter circuit configured to integrate and compensate the error current signal synchronously over each half of a switching period and sample a filter circuit signal to generate an integrated error current signal;
a phase feedback loop configured to control a difference in the integrated error current signal over each half of the switching period by adjusting a phase command using a negative feedback system, wherein the phase command causes net current flow to couple harmonic voltages of the secondary bridge and the primary bridge, and
a duty cycle feedback loop configured to reduce the integrated error current signal over the switching period by altering a duty cycle command using the negative feedback system;
at least one second controller coupled to the secondary bridge and configured to synchronously generate secondary control signals relative to a commanded second controller input signal to control the second plurality of switching devices; and
a power factor correction circuit configured to generate the commanded current using a shaped current command, wherein the power factor correction circuit comprises:
a voltage error amplifier which subtracts a signal proportional to a sensed bus voltage from a voltage reference to generate an average current command; and
a multiplier which multiplies the average current command by a signal proportional to a line voltage to generate the shaped current command.

2. The power converter of claim 1, wherein the bridge current sensor comprises resistive current shunt sensors coupled in series with the first plurality of switching devices which are operatively coupled to a current sense amplifier.

3. The power converter of claim 1, wherein the second plurality of switching devices comprises a full bridge circuit composed of at least two pairs of switching devices.

4. The power converter of claim 1, wherein the second plurality of switching devices comprises at least two switching devices coupled to at least one capacitor to form a capacitive half-bridge.

5. The power converter of claim 1, wherein the first plurality of switching devices comprises a full bridge circuit composed of at least two pairs of switching devices, or the first plurality of switching devices comprises at least two switching devices coupled to at least one capacitor to form a capacitive half-bridge.

6. The power converter of claim 1, wherein the transformer device comprises the secondary transformer winding and the primary transformer winding, and further comprising a determined turn ratio.

7. The power converter of claim 1, wherein the commanded second controller input signal is generated by a low pass filter that filters the duty cycle command from the at least one first controller.

8. The power converter of claim 1, wherein the at least one second controller is linearized using a current error amplifier which controls a return current, or the at least one second controller is linearized by sensing a second bus voltage and generating a regulation negative feedback signal, or the at least one second controller is linearized using a nested voltage and current feedback system.

9. The power converter of claim 1, wherein a current error amplifier has a command signal split into buck and boost pathways by diodes.

10. The power converter of claim 1, wherein the first plurality of switching devices are connected across a first voltage bus and a first energy storage capacitance, and the second plurality of switching devices are connected across a second voltage bus and second energy storage capacitance.

11. The power converter of claim 1, wherein a current sensor signal is multiplied by a logical difference signal to regulate a secondary current.

12. A method comprising:
generating first control signals for a primary bridge to set current regulation of a bidirectional line load;
generating second control signals for a secondary bridge to set voltage regulation of a voltage bus;
sensing a current flowing through switching nodes of the primary bridge to generate a measure of bridge current and driving a filter circuit using an amplifier;
summing an error current signal including a commanded current and the measure of bridge current;

integrating and compensating, using the filter circuit, the error current signal synchronously over each half of a switching period and sampling a filter circuit signal to generate an integrated error current;

controlling the integrated error current over the switching period by altering a duty cycle command using a negative feedback system;

controlling a difference in the integrated error current over each half of the switching period by adjusting a phase command using the negative feedback system, wherein the phase command causes net current flow to couple harmonic voltages of the secondary bridge and the primary bridge; and generating, by a power factor correction controller, the commanded current using a shaped current command, wherein the power factor correction controller comprises:

a voltage error amplifier which subtracts a signal proportional to a sensed bus voltage from a voltage reference to generate an average current command; and a multiplier which multiplies the average current command by a signal proportional to a line voltage to generate the shaped current command.

* * * * *